(12) United States Patent
Knowles et al.

(10) Patent No.: US 6,179,904 B1
(45) Date of Patent: Jan. 30, 2001

(54) FLUSHING MACHINE WITH LIQUID/AIR SEPARATING TANK

(75) Inventors: Steven M. Knowles, Silver Lake, IN (US); Jack Brass, North York (CA)

(73) Assignee: Brasscorp Ltd. (CA)

( * ) Notice: Under 35 U.S.C. 154(b), the term of this patent shall be extended for 0 days.

(21) Appl. No.: 09/205,361

(22) Filed: Dec. 4, 1998

Related U.S. Application Data (60) Provisional application No. 60/067,396, filed on Dec. 5, 1997.

(51) Int. Cl.[7] .............................. B01D 45/08; B01D 45/12
(52) U.S. Cl. .................................. 96/189; 55/337; 55/360
(58) Field of Search ............................ 96/189, 190, 195, 96/204, 208, 209, 211; 55/337, 459.1, 459.3, 462, 465, 360

(56) References Cited

U.S. PATENT DOCUMENTS

| | | | |
|---|---|---|---|
| 2,818,133 | * 12/1957 | Rosenthal | 55/59 |
| 2,893,510 | * 7/1959 | Spann | 96/209 |
| 4,092,137 | * 5/1978 | Howe et al. | 55/337 |
| 4,260,402 | * 4/1981 | Shaffer et al. | 55/337 |
| 4,297,116 | * 10/1981 | Cusick | 55/360 |
| 4,614,527 | * 9/1986 | Reimann | 96/189 |
| 4,688,252 | * 8/1987 | Gerdau | 55/337 |
| 4,746,335 | * 5/1988 | Reimann et al. | 96/189 |
| 4,963,168 | * 10/1990 | Spencer | 96/209 |
| 5,599,365 | * 2/1997 | Alday et al. | 96/189 |
| 5,676,717 | * 10/1997 | Cope et al. | 55/337 |
| 5,849,065 | * 12/1998 | Wojke | 95/261 |

* cited by examiner

Primary Examiner—Duane S. Smith
(74) Attorney, Agent, or Firm—Fitzpatrick, Cella, Harper & Scinto (57) ABSTRACT

An air powered flush machine capable of circulating a highly volatile flushing solvent through an air conditioning system or system components and then also capable of circulating a high volume of air through the system or components, to blow the solvent out of the components and thoroughly dry the system or components, without emitting an objectionable level of odour or hazardous level of fumes through the machines air exhaust outlet. The machine utilizes a receiving tank design which separates liquid solvent from the air flow before exhausting the air through its exhaust filter.

15 Claims, 7 Drawing Sheets

FLUSHING MACHINE WITH LIQUID/AIR SEPARATING TANK

This application claims priority to U.S. Provisional application Ser. No. 60/067,396 filed Dec. 5, 1997.

This invention relates to liquid/air separators in flushing devices.

BACKGROUND OF THE INVENTION

During maintenance of an air conditioning system, including an automatic air conditioning system, it is sometimes necessary to flush the system or system components by circulating solvent solution that may be volatile and/or odourous through the system components to dissolve and remove all contaminants and oil from the system components. These contaminants and oil must be completely removed from the system components before the system can be recharged with clean refrigerant and oil. If not completely removed, the residual contaminants or oil can cause problems or system failure after the system is back in operation.

Flush and purge machines for this purpose are known. The machine is connected to the component to be flushed. The solvent is fed from the machine through the system and back to the machine. Contaminants are dissolved by the solvent. The solvent is fed through the system for a period of time, for example half an hour.

After the solvent has been run through the system for a sufficient time, compressed air is fed through the system to purge the solvent. Liquid solvent drops out into a tank in the machine and the air is filtered by a charcoal filter in the machine. The compressed air is typically vented into the atmosphere. The vented fumes are unpleasant, potentially hazardous to breath, and/or potentially explosive.

Alternative systems are desirable.

SUMMARY OF THE INVENTION

In a first aspect the invention provides a separating tank for use in a flushing machine to flush an air conditioning system using liquid solvent and to purge the solvent from the system. The tank has a chamber and an inlet port for receiving solvent-laden air and liquid. A tube is connected to the inlet port and exits into the chamber. The tube directs the solvent-laden air and liquid outwardly from the tube into the chamber. The tank also has an exhaust port from the chamber for venting air from the chamber.

The tube may have an outward portion that is angled outwardly and downwardly to create a spinning motion of solvent-laden air and liquid. The chamber may contain walls against which at least a portion of the solvent-laden air and liquid can hit as it moves outwardly from the tube.

The tank may also have a baffle plate dividing the chamber into a receiving compartment and an exhaust compartment. In this case, the tube exits into the receiving compartment, and the exhaust port vents air from the exhaust compartment; while, the baffle plate contains holes to allow passage of air from the receiving compartment to the exhaust compartment.

The holes of the baffle plate may begin at a distance beneath the tube outward portion, so that at least a portion of the solvent-laden air and liquid can hit against an upper portion of the baffle plate above the holes.

The tank may have walls that have corners where the walls meet to create additional air turbulence. The walls may be square to one another for additional air turbulence.

The tank may have a filter on the exhaust port for removing solvent vapour. The tank may have a one-way valve for allowing air to vent through the exhaust port under pressure, while otherwise preventing air from venting through the exhaust port. The tank may be grounded to prevent sparks.

In a further aspect the invention provides a flushing machine for use with an air conditioning system to flush the air conditioning system using liquid solvent and to purge the solvent from the system. The machine has the tank discussed above, an outlet hose for connection to the system, an air pump for forcing air into the system through the outlet hose; and a return hose for receiving solvent-laden air and liquid from the system. The inlet hose is connected to the inlet port of the tank.

BRIEF DESCRIPTION OF THE DRAWINGS

For a better understanding of the present invention and to show more clearly how it may be carried into effect, reference will now be made, by way of example, to the accompanying drawings which show a preferred embodiments of the present invention, and in which.

DETAILED DESCRIPTION OF THE PREFERRED EMBODIMENT

Referring to the Figures, a machine 1 is powered only by compressed air. The machine 1 is connected at connection 3 to a normal compressed air supply line, now shown, available in service locations for power. An air conditioning system, not shown, (or components to be flushed, such as an evaporator or condenser) is connected to the outlet hose 5 of the machine 1 and to the return hose 7 of the machine 1 (forming a continuous loop) so that the machine 1 can circulate flushing solvent 8 or air through the system or components and back into the machine 1.

Figure 1:
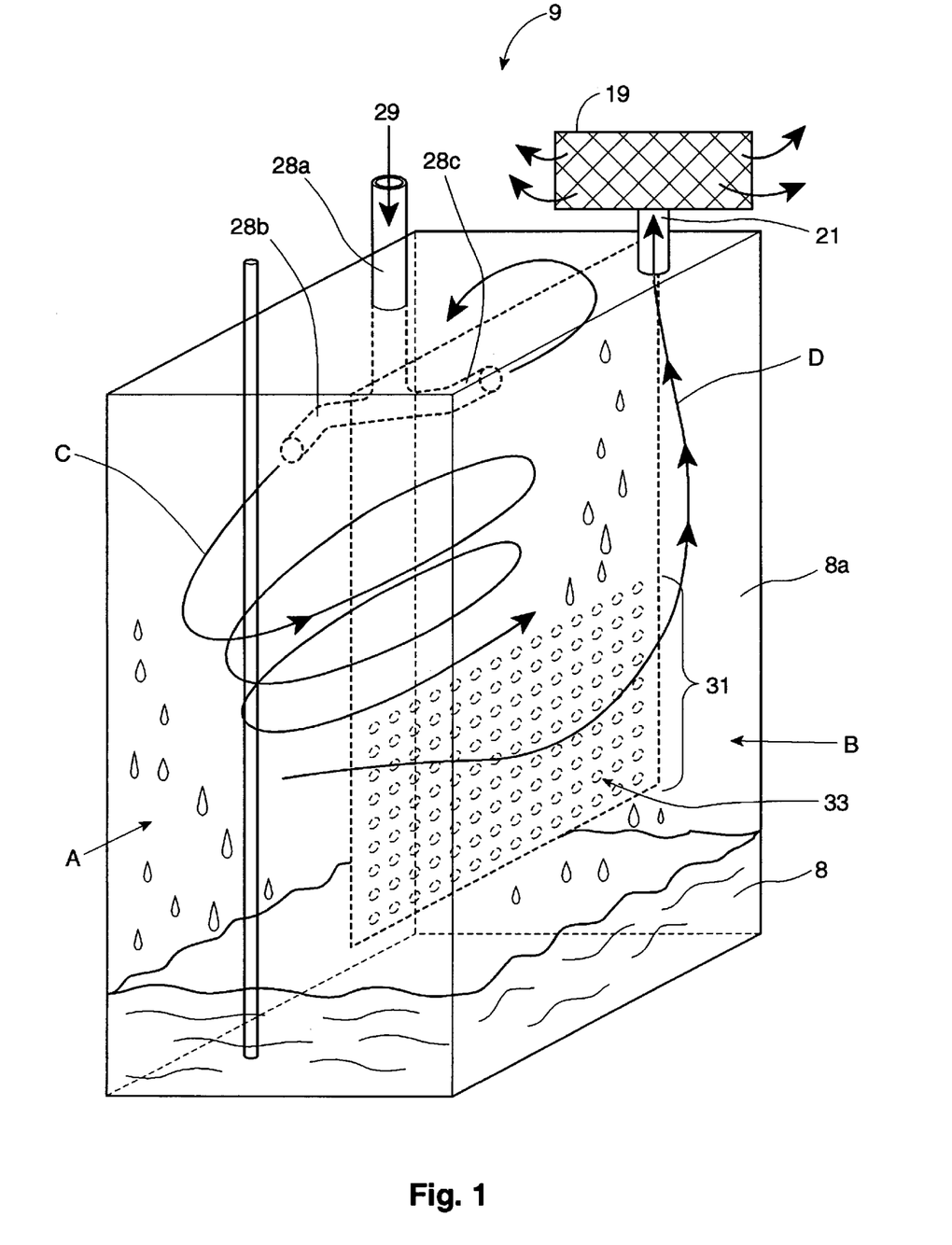
FIG. 1: is a see through perspective of a tank according to the preferred embodiment of the invention.
Figure 2:
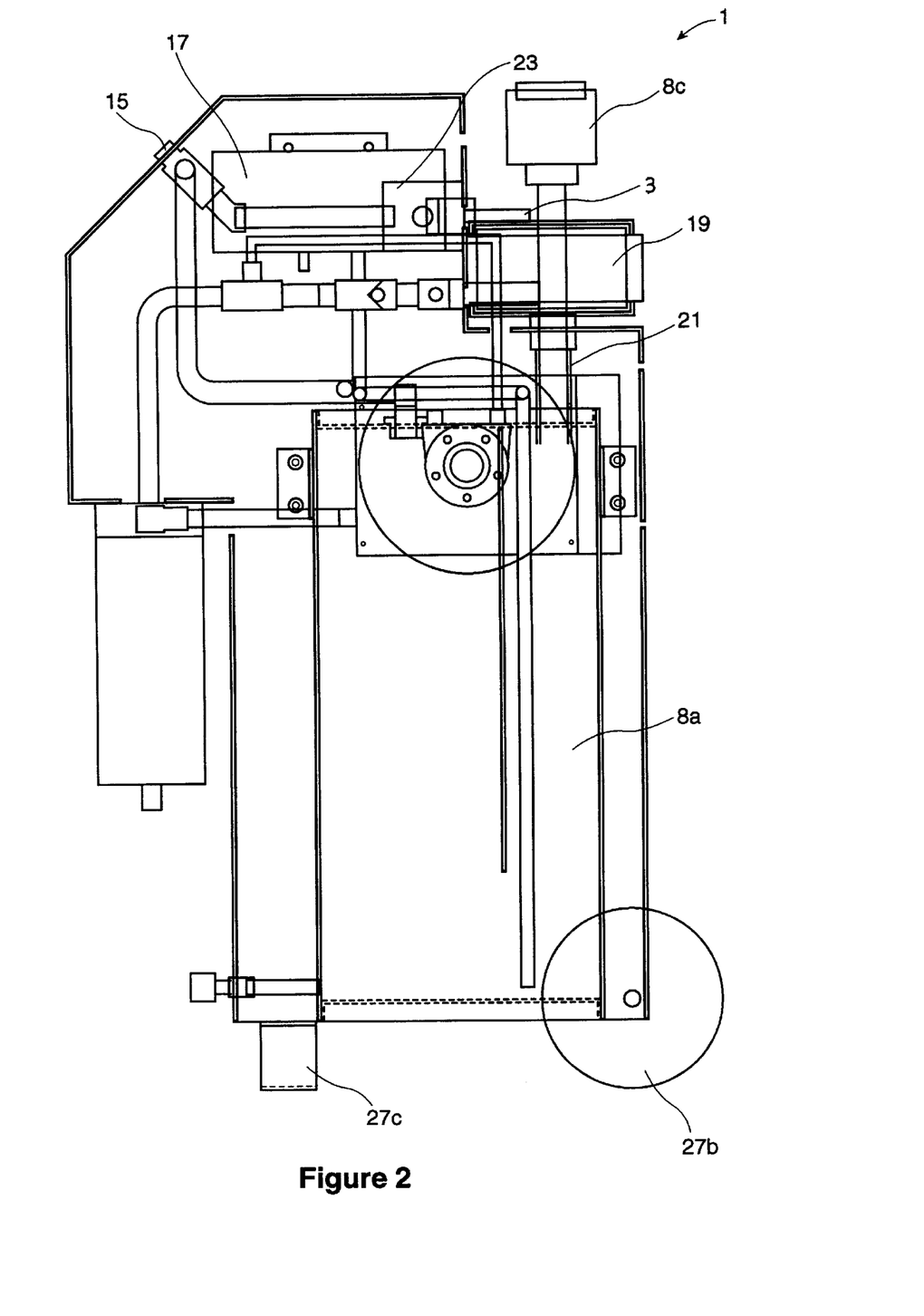
FIG. 2: is a side cross-section of a flushing machine employing the tank of FIG. 1 according to the preferred embodiment of the invention.
Figure 3:
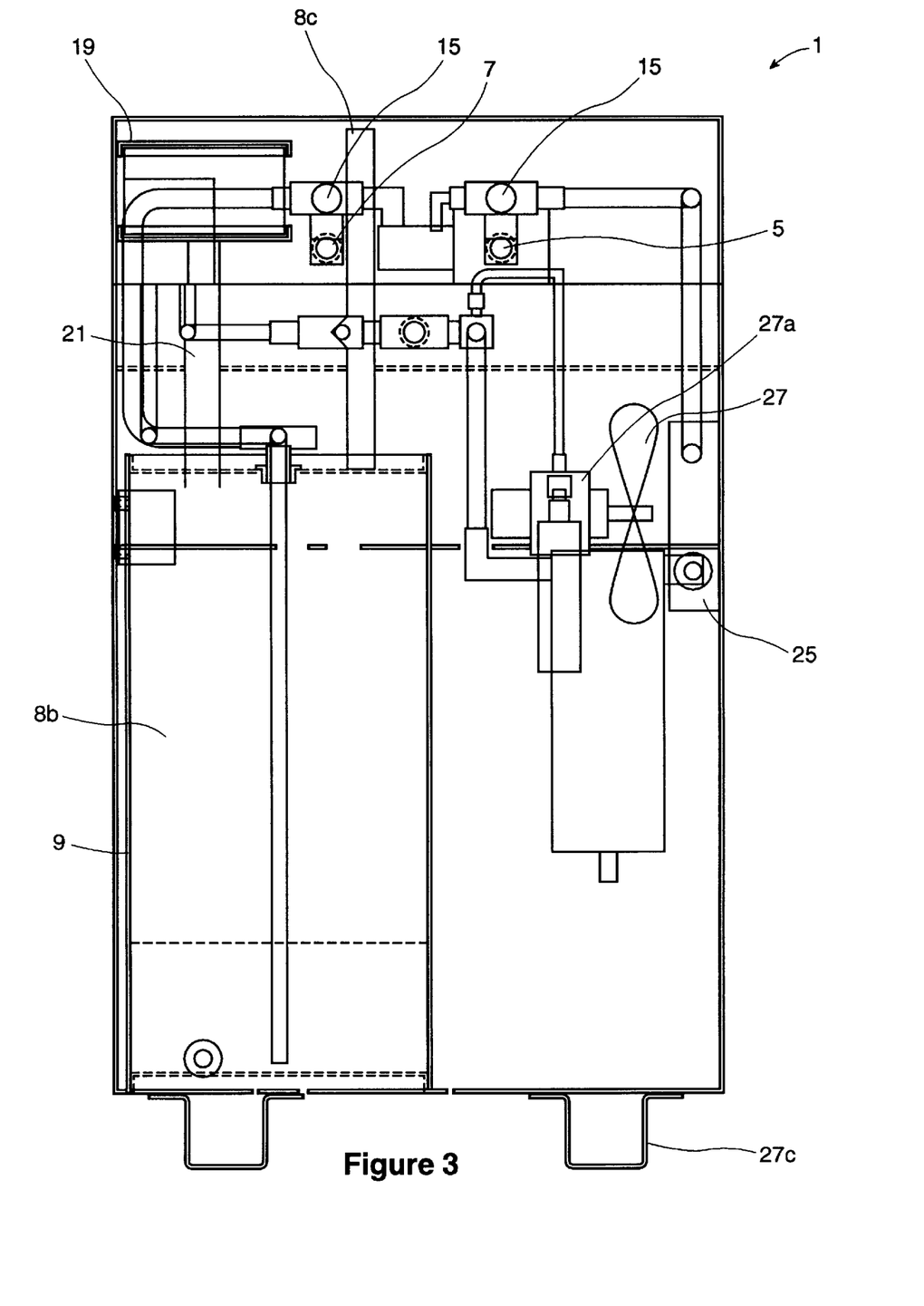
FIG. 3: is a see-through front view within the flushing machine of FIG. 2.

The machine has a receiving chamber 8b in a tank 9 into which the proper amount of the desired flushing solvent 8 is placed through fill pipe 8c. The machine 1 has a purge mode 11 and a flush mode 13 selected at a control 15. When the machines control 15 is placed in the "flush" mode 13, an air powered pump 17 is activated and circulates the solvent out of the tank 9, through the system or components to be flushed and back into the tank. The solvent 8 is circulated until the system is clean.

After the flushing solvent 8 is circulated through the components to clean them, the flushing solvent 8 itself must then be purged from the components. The preferred method for purging the flushing solvent 8 out of the components is to blow the solvent 8 out by passing a high volume of compressed air through the components until all solvent 8 is blown out and the components are completely dry. The high volume air flow forces the liquid solvent 8 out of the system components and back into the receiving tank 9 in the machine 1. The air passes through the tank 9 and is exhausted out of the tank 9 through an activated charcoal filter 19 that removes the solvent 8 vapour to prevent odour and hazardous fumes from exiting the machine 1 through its exhaust port 21.

Figure 6:
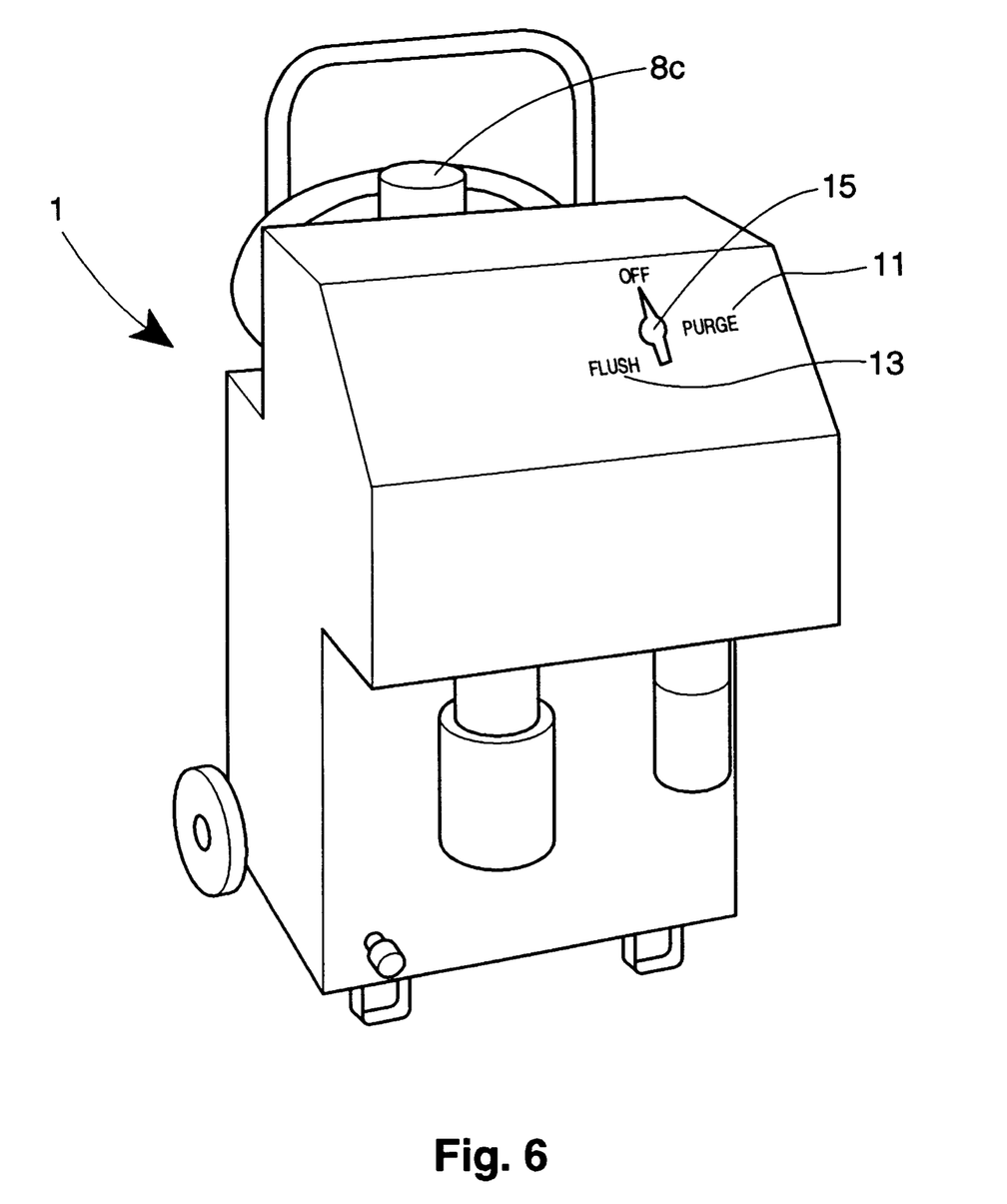
FIG. 6: is a perspective view of the flushing machine of FIG. 2.

To accomplish this "purge", the machine controls 15 are placed in the "purge" mode 11. Compressed air is passed through a regulator 23 to regulate to a preset pressure. The air is then passed through a condensing coil 25 which has a fan 27 power by an air motor 27*a* blowing air across the coil 25 to reduce air temperature and condense out moisture. The air then exits the machine through the outlet hose 5 and enters the components being purged. After passing through the components, the air returns to the machine 1 through the return hose 7. The air flow initially blows the liquid solvent 8 out of the system and then dries the system as it continues to flow through the components. The air does not circulate through the system repeatedly but rather is blown through the system, back into the machine 1 and is exhausted out of the exhaust port 21 filter 19 on the solvent tank 9. This purge continues until the components are completely dry.

Because of the high volume of air rushing through the tank 9, without proper and complete separation, liquid solvent or saturated vapour will be carried to the exhaust filter, as is the case with machines, not shown, currently on the market. The machines currently on the market emit objectionable levels of odour and may emit hazardous levels of fumes because the exhaust air is carrying saturated vapour or even liquid solvent out through the exhaust filter. These machines do not separate the liquid solvent from the air flow adequately.

When liquid solvent or saturated vapour is carried to the exhaust filter by the air flow, the filter quickly saturates, allowing vapour and/or liquid to pass through. When this happens, the exhaust air will be very odorous and objectionable and may carry enough fumes to be hazardous.

The machine 1 has a receiving tank 9 that is designed to receive a high volume of liquid solvent 8 and air mixture, separate the liquid from the air completely and trap the solvent 8 in the tank 9 while allowing the air to pass through the tank 9 and exhaust out through the exhaust filter 19. The tank 9 is designed such that the liquid solvent 8 is separated completely from the air flow and retained completely in the tank 9 before the air is exhausted. The tank 9 design completely separates the liquid and saturated vapour from the air flow and thus prevents any liquid of any saturated vapour from reaching the exhaust filter 19. Since no liquid solvent 8 or saturated vapour reaches the exhaust filter 19, the filter 19 can effectively filter out the vapour. Thereby, passing a clean air flow out of the exhaust port 21 of the machine 1, with no objectionable odour and no hazardous level of fumes.

The machine 1 is powered by air to preclude any chance of electrical sparks because of the flammability of the solvent 8 to be circulated by this machine 1. The machine 2 has a grounded inlet 7 and outlet 5 hoses to prevent any static electricity from generating a static spark. It also has conductive wheels 27*b* and conductive standoffs 27*c* for further grounding.

PRINCIPAL OF OPERATION OF RECEIVING TANK

The successful operation of this machine 1 depends upon the ability of the solvent receiving tank 9 to completely separate the liquid solvent 8 from the air flow. The tank 9 must separate the liquid solvent from the air, retain the liquid solvent 8 in the tank 9, and allow the air to pass out of the tank 9. If the liquid solvent 8 is not completely separate from the air, the exhaust from the machine 1 will contain excessive odour and possibly hazardous levels of fumes. The tank 9 accomplishes separating the liquid solvent 8 from the air flow by a combination of principles.

Figure 4:
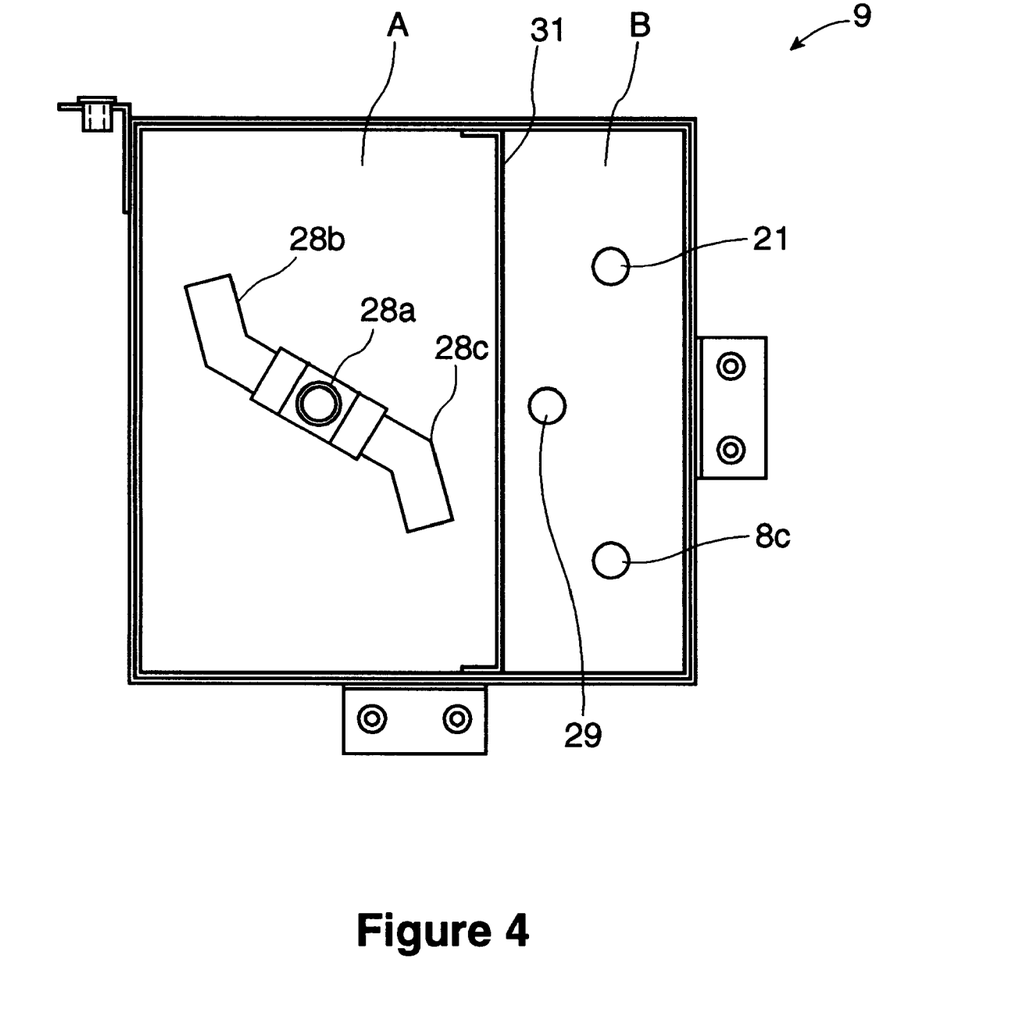
FIG. 4: is a plan view of the tank of FIG. 1.
Figure 5:
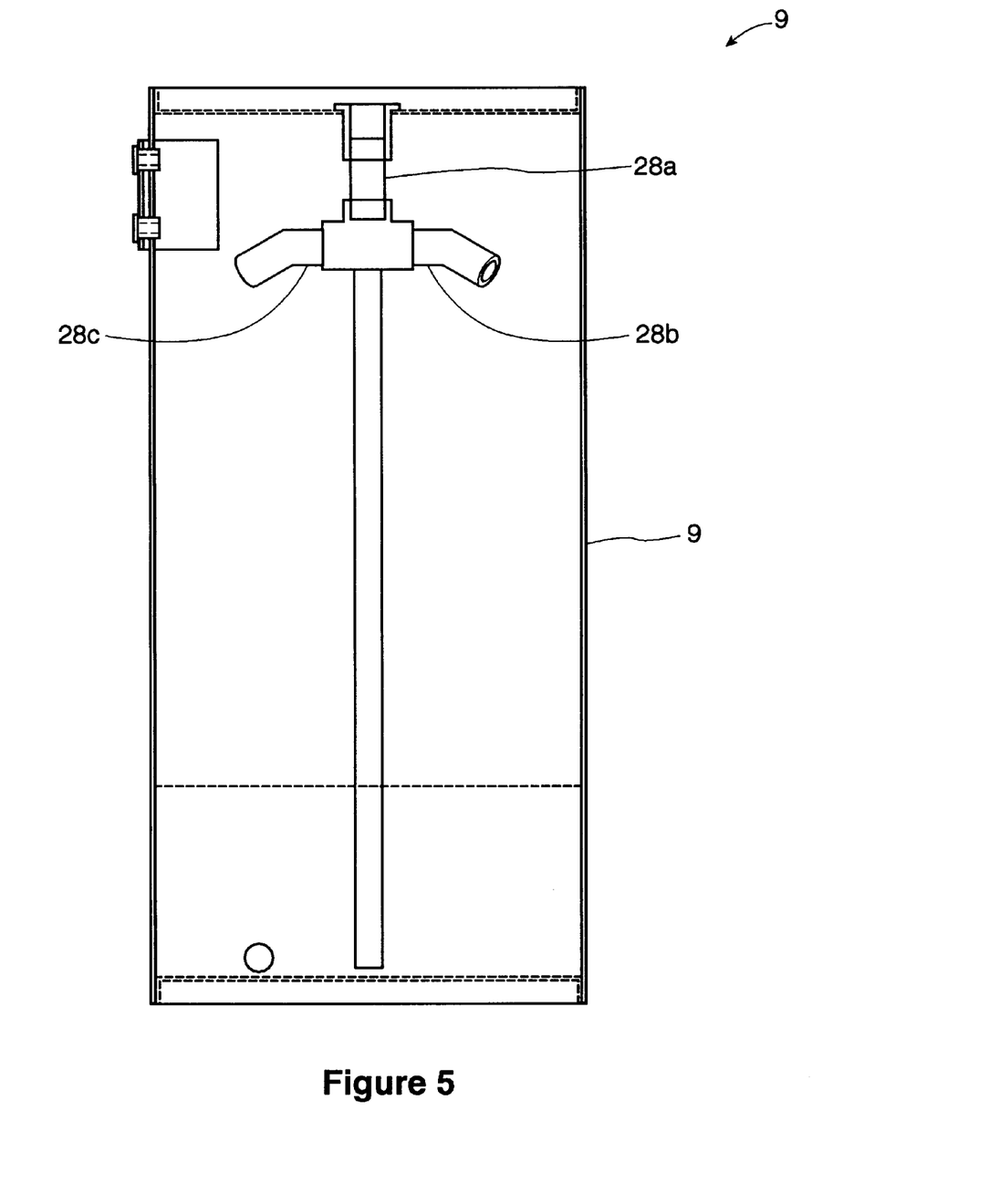
FIG. 5: is a see-through side view of the tank of FIG. 1.

The liquid and air mixture enters the top of the tank 9 flowing vertically downward through a single tube 28*a* fluid inlet 29. Inside the tank 9, the solvent 8/air stream is split into two separate tubes 28*b*, *c*, which are 180 degrees opposed to each other and which are turned angularly outward and spirally downward. As the air/liquid mixture exits the spiralling tubes 28*b*, *c*, it is spinning outward towards the sides of the tank 9 and downward toward the bottom of the tank 9. The shape of the tank 9 is square and is divided into two separate compartments A, B by a specially designed baffle plate 31. As the liquid/air mixture exits the two tubes 28*b*, *c*, its pressure and velocity is suddenly reduced due to the expansion into a larger volume. This sudden reduction in pressure and velocity causes some of the liquid which is heavier than the air, to fall to the bottom of the tank 9, while the air spirals continue outward to the sides of the tank 9.

The spiralling, spinning action of the air stream throws more remaining liquid outward due to centrifugal force. This causes the liquid to be thrown against the tank 9 wall and its falls to the bottom of the tank 9.

As the air stream continues to spin around inside the first compartment of the tank 9 as indicated by arrows C, which is rectangular in shape, each time it goes past a corner of the tank 9, its flow is interrupted and slowed, and turbulence is created which causes yet more liquid to fall out of the stream or hit the corners of the tank 9 and fall towards the bottom of the tank 9.

The swirling air streams remain above the liquid solvent 8 that is collected in the bottom of the tank 9 so that turbulence is not created in the liquid solvent 8 and liquid solvent 8 is therefore not reintroduced into the air stream. Since the solvent 8 is very volatile, and turbulence created in the liquid solvent 8 would cause the liquid solvent 8 to go back into the air stream.

The air flow which remains above the liquid solvent 8 collected in the bottom of the tank 9 can move through holes 33 in a baffle plate 31 as indicated by arrow D (which are located above the liquid solvent 8 level but below the entering air/liquid spirals) into a second chamber of the tank 9. To pass through the holes 33 in the baffle 31, the air must turn 90 degrees to its direction of movement pass through the holes 33 in the baffle 31 and then turn an additional 90 degrees to go vertically upward toward the tank 9 exit exhaust port 19. The remaining heavier liquid solvent 8 cannot make the 90 degree turns (total of 180 degrees) and therefore falls out into the tank 9 bottom.

The exhaust port 19 is located in the top of the second chamber B. Therefore, only air containing no liquid or saturated vapour can pass through the holes 33 in baffle plate 31, into the second chamber and rise up to the exist of the tank 9. The exhaust port 21 is further fitted with a filter 19 which can filter out the solvent 8 vapour from the air stream easily since there is not liquid solvent 8 remaining in the air stream.

Because of the unique tank 9 design and function, only dry solvent vapour can reach the exhaust port 21 of this machine 1. The exhaust filter 19 can then easily remove the vapour. Therefore only clean dry air with extremely low odour level is exhausted from this machine 1. The tank 9 design is critical to the efficient and safe operation of this flushing machine 1.

Figure 7:
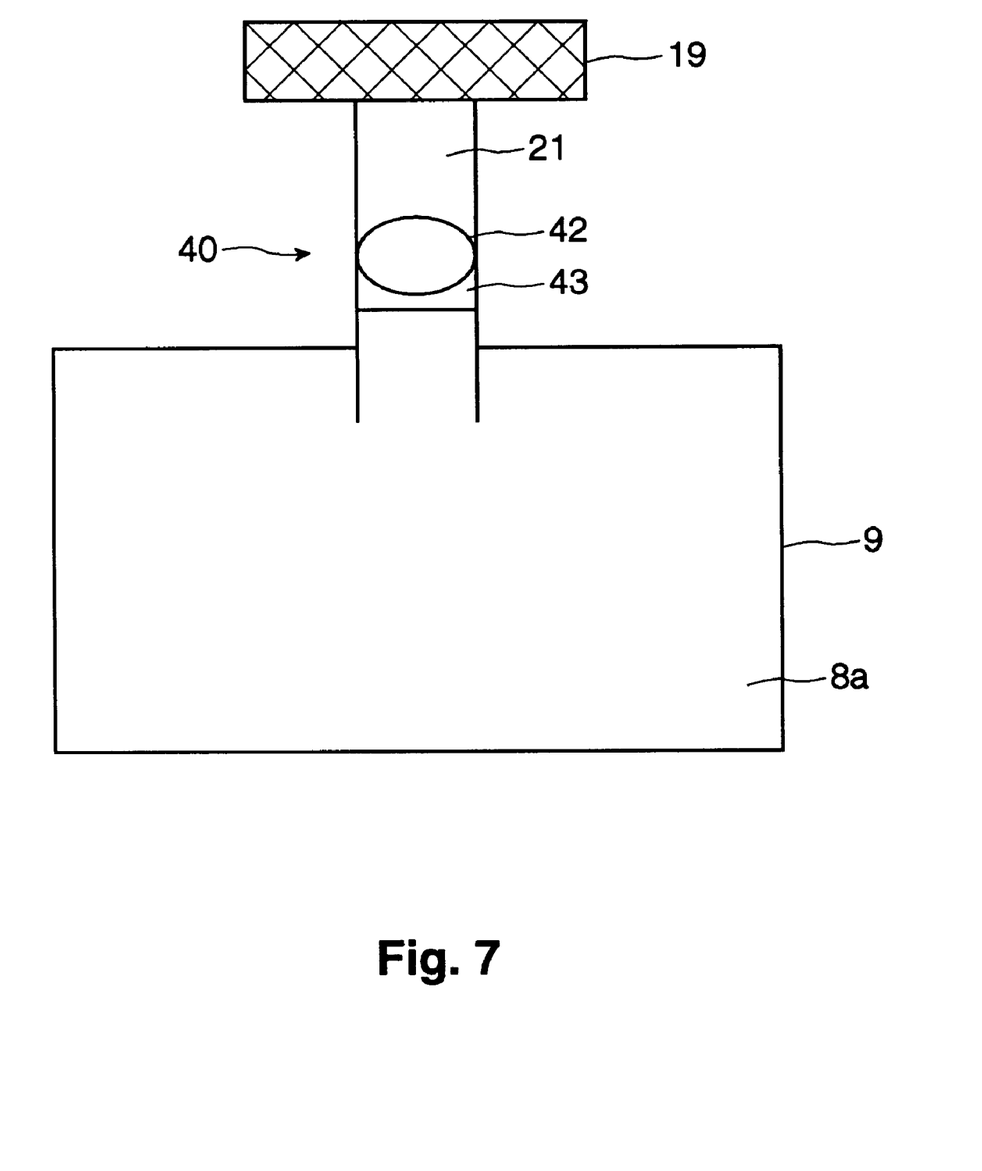
FIG. 7: is a diagrammatic view of a one-way valve used in the tank of FIG. 1.

If the machine 1 is left sitting liquid solvent 8 may evaporate into the air and accumulate in the filter 19 over time. This can cause an emission of solvent odour on start up. It is useful to use a one-way valve 40 in the exhaust port 21, such as a ball 42 and seat 43 in the exhaust port 21. The ball 42 raises up when under pressure while the machine 1 is in operation and falls back into the seat 43 when the machine 1 is turned off. This prevents solvent vapour from accumulating in the filter 19. Other one-way valves 40 may be used provided they can withstand the caustic nature of the solvent 8.

It will be understood by those skilled in the art that this description is made with reference to the preferred embodiment and that it is possible to make other embodiments employing the principles of the invention which fall within its spirit and scope as defined by the following claims.

We claim:

1. A separating tank for use in a flushing machine to flush an air conditioning system using liquid solvent and to purge the solvent from the system, the tank comprising:

a chamber, an inlet port for receiving solvent-laden air and liquid;

a tube connected to the inlet port and exiting into the chamber, wherein the tube has an outward portion that is angled outwardly and downwardly to create a spinning motion of solvent-laden air and liquid, the tube to direct the solvent-laden air and liquid outwardly form the tube into the chamber;

chamber walls against which at least a portion of the solvent-laden air and liquid can hit as it moves outwardly from the tube;

an exhaust port from the chamber for venting air from the chamber; and a baffle plate dividing the chamber into a receiving compartment and an exhaust compartment; the tube exiting into the receiving compartment, and the exhaust port venting air from the exhaust compartment; the baffle plate containing holes to allow passage of air from the receiving compartment to the exhaust compartment.

2. The tank of claim 1, wherein the tube has an outward portion that is angled outwardly and downwardly to create a spinning motion of solvent-laden air and liquid.

3. The tank of claim 1, wherein the chamber contains walls against which at least a portion of the solvent-laden air and liquid can hit as it moves outwardly from the tube.

4. The tank of claim 1, wherein the holes of the baffle plate begin at a distance beneath the tube outward portion, so that at least a portion of the solvent-laden air and liquid can hit against an upper portion of the baffle plate above the holes.

5. The tank of claim 4, wherein the walls have corners where the walls meet for additional air turbulence.

6. The tank of claim 4, wherein the walls are square to one another for additional air turbulence.

7. The tank of claim 1, comprising a filter on the exhaust port for removing solvent vapor.

8. The tank of claim 7, further comprising a one-way valve for allowing air to vent through the exhaust port under pressure, while otherwise preventing air from venting through the exhaust port.

9. The tank of claim 1, wherein the tank is grounded to prevent sparks.

10. A flushing machine for use with an air conditioning system to flush the air conditioning system using liquid solvent and to purge the solvent from the system, the machine comprising:

a separating tank including:

a chamber;

an inlet port for receiving solvent-laden air and liquid;

a tube connected to the inlet port and exiting into the chamber, wherein the tube has an outward portion that is angled outwardly and downwardly to create a spinning motion of solvent-laden air and liquid, the tube to direct the solvent-laden air and liquid outwardly from the tube into the chamber;

chamber walls against which at least a portion of the solvent-laden air and liquid can hit as it moves outwardly from the tube;

an exhaust port from the chamber for venting air from the chamber; and a baffle plate dividing the chamber into a receiving compartment and an exhaust compartment; the tube exiting into the receiving compartment, and the exhaust port venting air from the exhaust compartment; the baffle plate containing holes to allow passage of air from the receiving compartment to the exhaust compartment;

an outlet hose for connection to the system;

an air pump for forcing air into the system through the outlet hose;

a return hose for receiving solvent-laden air and liquid from the system; and wherein an inlet hose is connected to the inlet port of the tank.

11. The flushing machine of claim 10 wherein the holes of the baffle plate begin at a distance beneath the tube outward portion, so that at least a portion of the solvent-laden air and liquid can hit against an upper portion of the baffle plate above the holes.

12. The flushing machine of claim 11, wherein the walls have corners where the walls meet for additional air turbulence.

13. The flushing machine of claim 11, wherein the walls are square to one another for additional air turbulence.

14. The flushing machine of claim 10, further comprising a filter on the exhaust port for removing solvent vapor.

15. The flushing machine of claim 14, further comprising a one-way valve for allowing air to vent through the exhaust port under pressure, while otherwise preventing air from venting through the exhaust port.

* * * * *